Oct. 19, 1954    J. R. WINTERS ET AL    2,692,069
GUN RACK
Filed Jan. 23, 1953    2 Sheets-Sheet 1

James R. Winters
Victor A. Agostini    INVENTORS

Oct. 19, 1954
J. R. WINTERS ET AL
2,692,069
GUN RACK
Filed Jan. 23, 1953
2 Sheets-Sheet 2
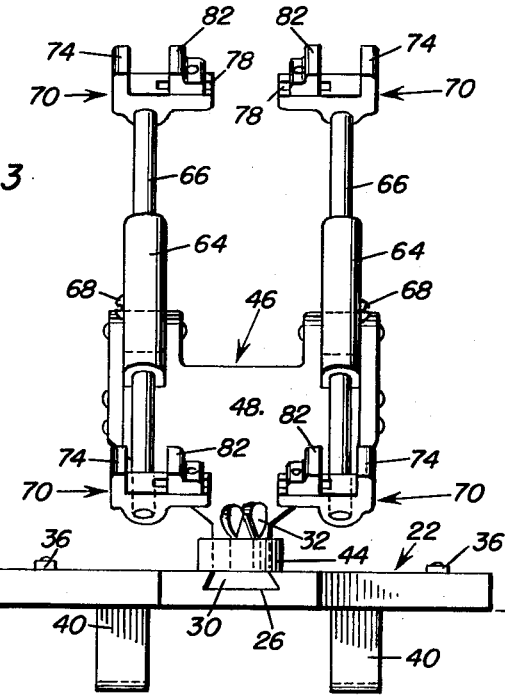
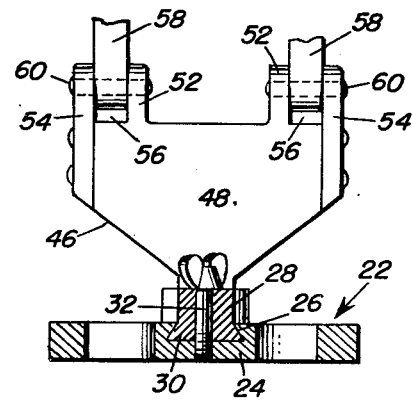
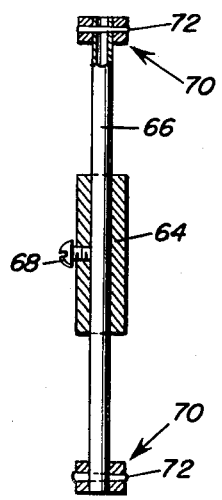
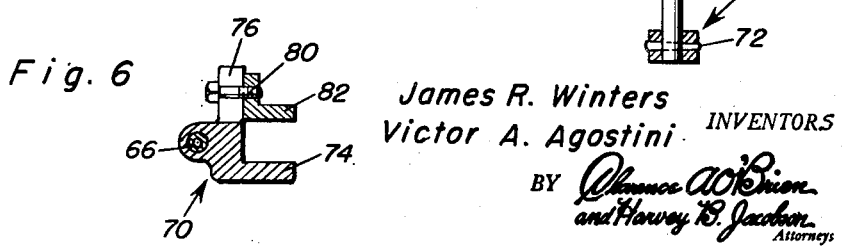
James R. Winters
Victor A. Agostini
INVENTORS Patented Oct. 19, 1954

2,692,069

UNITED STATES PATENT OFFICE 2,692,069

GUN RACK

James R. Winters, Vergennes, and Victor A. Agostini, Bennington, Vt.

Application January 23, 1953, Serial No. 332,883

7 Claims. (Cl. 224—1)

This invention relates to gun racks and more particularly to a rack for resting guns in a safe and convenient position within a vehicle.

An object of this invention is to provide a gun rack which is adjustable so as to properly support firearms of various sizes and lengths.

Another object of this invention is to provide a gun rack which may be conveniently positioned upon a vehicle seat and which is provided with means for preventing shifting of the rack assembly with relation to the seat.

Another object of this invention is to provide a gun rack including a base and a horizontally adjustable support assembly which is adapted to receive the forward portion of a firearm in a position extending substantially upright within a vehicle so that the firearm, even though accidently discharged, will not harm the occupants of the vehicle.

Another object of this invention is to provide a gun rack having an adjustable cradle mechanism which will conveniently support firearms of different types and sizes.

These together with other objects and advantages which will become subsequently apparent reside in the details of construction and operation as more fully hereinafter described and claimed, reference being had to the accompanying drawings forming a part hereof, therein like numerals refer to like parts throughout, and in which:

Figure 3 is a front elevation of the gun rack on an enlarged scale;

Figure 4 is a vertical section taken substantially along the plane of section line 4—4 of Figure 2 and showing details of the supporting rack assembly as mounted on the rack base;

Figure 5 is a section taken substantially along the plane of section line 5—5 of Figure 1 and showing details of the cradle assembly on an enlarged scale; and, Figure 6 is a section taken along the plane of section line 6—6 of Figure 1 and showing the details of one of the fire arm receiving portions of the cradle assembly.

Figure 1:
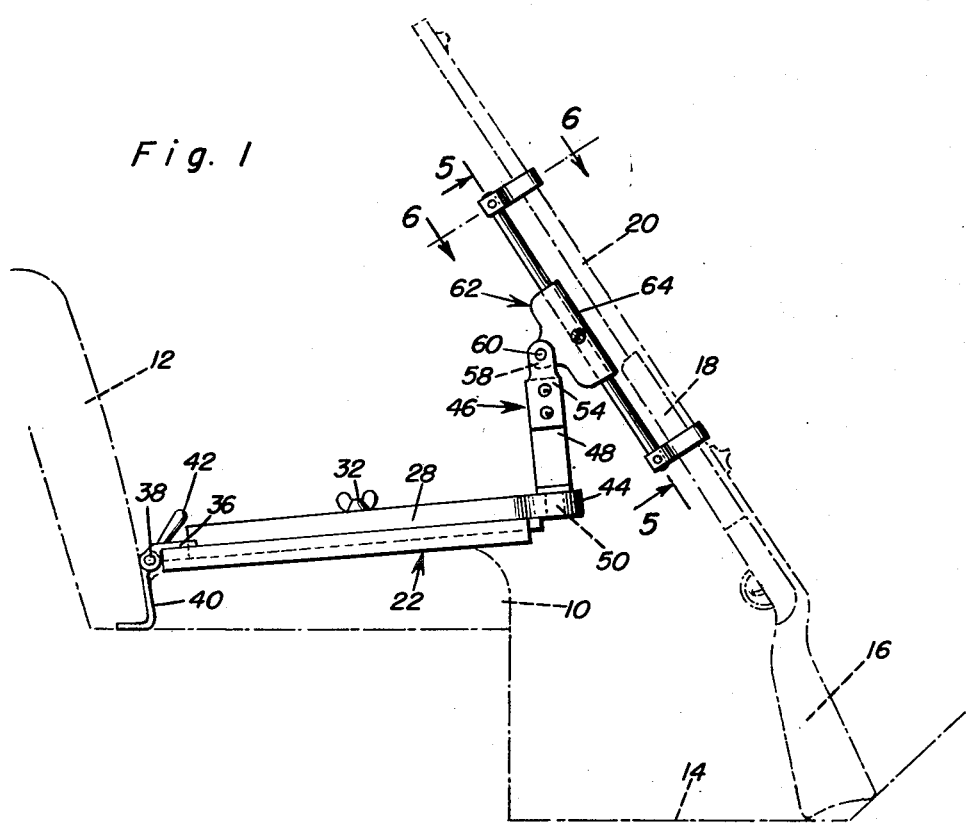
Figure 1 is a vertical side elevation of the gun rack and showing the rack supported upon a vehicle seat and supporting the forward portion of a rifle, the vehicle and the rifle being indicated by dotted lines.

Referring now more particularly to Figure 1, a portion of a vehicle is shown in dotted lines and reference numeral 10 indicates a cushion of a vehicle seat while reference numeral 12 indicates the back portion of the seat and reference numeral 14 indicates the floor board of the vehicle. A rifle or shot gun is also shown in dotted lines and includes a butt portion 16, a forward hand grip portion 18 and a barrel 20.

The gun rack is comprised of a base 22 which may be disposed upon the seat cushion 10 and one of the base members 24 is provided with a longitudinally extending trapezoidal slot 26 formed in the upper surface of the member. A horizontal adjustment member 28 is provided with a trapezoidal guide 30 received within slot 26 so that the support member is slidable longitudinally of the base and for the purpose of securing the member at any desired point along the base, a wing bolt 32 is threadedly engaged within member 24 and is movable within the confines of a vertical elongated slot 34 extending through member 28. Obviously, the thumb screw may be loosened to permit sliding movement between the base and the supporting member and tightened when it is desired to secure the member to the base.

Secured transversely of the rear portion of the base by brackets 36 is a pivot shaft 38 which is provided intermediate the brackets 36 with a pair of spaced L-shaped feet 40. As shown clearly in Figure 1, the feet are adapted to be positioned between the seat cushion and back and may include laterally offset portions extending beneath the seat back, the purpose of these feet being to prevent forward shifting of the gun rack assembly with relation to the seat and it will be noted that they also tend to prevent lateral shifting thereof. To permit the feet to be manipulated into and out-of-engagement between the seat portion, a handle 42 is rigidly secured to one end of shaft 38 and by movement of the handle lever counterclockwise, in Figure 1, the feet will deform the seat cushion permitting the withdrawal of the feet from the full line position shown. In this manner, the rack assembly may be quickly and conveniently positioned in operative position upon the seat cushion or removed therefrom for storage.

The forward or free end of supporting member 28 is provided with a boss 44 to which a cradle supporting assembly, designated generally by the reference character 46, is supported, the cradle supporting assembly being positioned in substantially perpendicular relation to the member 28.

Figure 2:
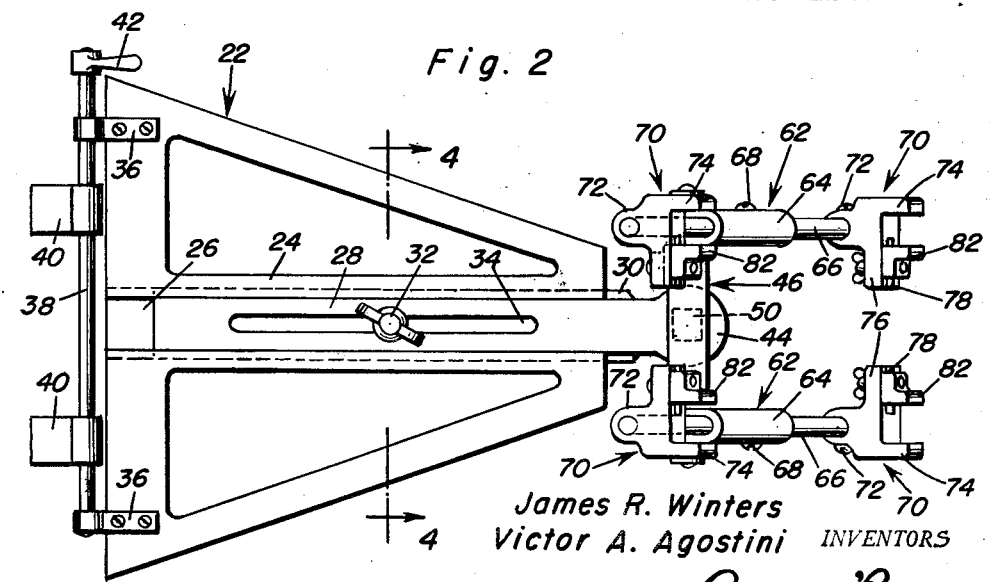
Figure 2 is a plan view of the gun rack on an enlarged scale.

Referring more particularly to Figures 3 and 4, the assembly 46 includes a main body portion 48 which tapers downwardly at its lower end to a shank or neck 50 which is secured within boss 44, see Figures 1 and 2. This shank may be rectangular as is shown or may be of circular cross-section to allow swiveling of the assembly 46 upon member 28.

The upper end of the cradle supporting assembly is provided with a pair of ears 52 adjacent each of its sides and which extend upwardly therefrom and side plates 54 attached to the sides of the assembly extend in spaced relation to the ears and define a space 56 therebetween within which bracket ears 58 may be inserted. Pivot pins 60 extend through the various ears and pivotally secure brackets 62 to the cradle supporting assembly.

Each of the brackets 62 form a part of a cradle assembly which is adapted to support the forward portion of the firearm and the brackets include a journal or boss 64 through which a cradle rod 66 is slidably received and is maintained in adjusted position within the boss by means of the set screws 68. Opposite ends of each cradle rod are provided with laterally offset cradle brackets 70 which are secured, as by pin 72, to the rods. Each of the cradle brackets includes an upstanding ear 74 and an ear 76 disposed at right angles thereto and which is provided with an inwardly extending slot 78 at its outer or free end. A bolt 80 extends through the slot and clamps another ear 82 to the bracket in spaced relation to ear 74 and it will be readily apparent that the ear 82 is adjustable with respect to the other ear so that different widths of firearms may be accommodated between these ears.

In operation, the gun rack assembly is placed upon a vehicle seat and the operating handle 42 manipulated to place the feet 40 in their operative position to prevent shifting of the assembly and by manipulating the various adjusting bolts 32 and 68, and manipulating the cradle assembly about its pivot 60, the forward portion of a gun or rifle or similar firearm may be supported in the cradle with its butt 16 resting against the floorboard of the vehicle so that the firearm extends in rearwardly inclined position with respect to the vehicle and will remain in supported relation in the cradle brackets 70 by its own weight. In this respect, it will readily be apparent that it is neither desirable nor necessary to clampingly engage the ears 74 and 82 against the firearm, it being merely necessary that they be spaced closely enough together as to prevent shifting of the firearm within the brackets. When it is desired to use the firearm, it is merely necessary to grasp the same and swing it outwardly of the cradle brackets and remove it from the vehicle.

Another important advantage attained by the use of the gun rack resides in the fact that the firearm is so supported that its sight mechanism does not contact any object. This is important since it frequently occurs during transportation that the firearm sight will rest against some object which when the vehicle lurches or is jarred, will damage the sight mechanism or throw it out of adjustment necessitating expensive repairs or, at best, the inconvenience of readjusting the mechanism.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A gun rack comprising a base, a member movably carried by said base and provided with means for securing the member to the base in a desired position thereon, a support on said member extending upwardly therefrom, means pivotally carried by the upper end of said support for resting the forward portion of a firearm therein, said base being adapted to be disposed on the cushion of a vehicle seat, means carried by said base adapted to be positioned between the seat cushion and the back of a seat to prevent the rack from shifting relative to the seat.

2. A gun rack comprising a base including a portion having a longitudinally extending trapezoidal slot, a member slidably received in said slot, means operatively connected to said base and said member for selectively securing the member at a desired point along said portion, a substantially upright support carried by said member and having a pair of spaced ears receiving a cradle herebetween, said cradle being elongated and extending in the direction of said slot, a pin extending through said ears and said cradle for pivotally securing the cradle about a transverse horizontal axis, means at the opposite ends of said cradle for supporting a firearm.

3. A gun rack comprising a base including a portion having a longitudinally extending trapezoidal slot, a member slidably received in said slot, means operatively connected to said base and said member for selectively securing the member at a desired point along said portion, a substantially upright support carried by said member and having a pair of spaced ears receiving a cradle therebetween, said cradle being elongated and extending in the direction of said slot, a pin extending through said ears and said cradle for pivotally securing the cradle about a transverse horizontal axis, means at the opposite ends of said cradle for supporting a firearm, said cradle comprising a bracket carried by said ear and having a longitudinal boss, a rod slidably received in said boss, said last means being carried at opposite ends of said rod, and a set screw in said boss engageable with the rod.

4. A gun rack comprising an elongated horizontal base, a bar member slidably carried by said base and mounted for movement into various selected fixed positions thereon, an upright secured to the forward end of said bar member, a bracket, a horizontal pivot pin pivotally securing the upper end of said upright to said bracket, a rod selectively slidable within said bracket, means on the opposite ends of said rod for supporting the forward portion of a firearm.

5. A gun rack comprising an elongated horizontal base; a bar member slidably carried by said base and mounted for movement into various selected positions thereon, an upright secured to the forward end of said bar member, a bracket, a horizontal pivot pin pivotally securing the upper end of said upright to said bracket, a rod selectively slidable within said bracket, means on the opposite ends of said rod for supporting the forward portion of a firearm, said base being adapted to be placed on a vehicle seat, and means on the rearward end of said base for insertion between a seat cushion and back rest for retaining said base against longitudinal shifting within an associated vehicle.

6. A gun rack comprising an elongated horizontal base, a bar member slidably carried by said base and mounted for movement into various selected fixed positions thereon, an upright secured to the forward end of said bar member, a bracket, a horizontal pivot pin pivotally securing the upper end of said upright to said bracket, a rod selectively slidable within said bracket, means on the opposite ends of said rod for supporting the forward portion of a firearm, said means including a fixed and a movable jaw for confining an associated firearm therebetween.

7. The combination of claim 5, wherein the last mentioned means includes a shaft journalled transversely at the rear of said base, and an L-shaped foot secured to said shaft.

References Cited in the file of this patent

UNITED STATES PATENTS

| Number | Name | Date |
|---|---|---|
| 125,743 | Lehnert | Apr. 16, 1872 |
| 321,930 | Wunderlick | July 7, 1885 |
| 505,320 | Meadows | Sept. 19, 1893 |
| 739,202 | Murphy | Sept. 15, 1903 |
| 1,537,772 | Hitzler | May 12, 1925 |
| 1,828,249 | Hammond | Oct. 20, 1931 |
| 1,912,514 | Curtis et al. | June 6, 1933 |
| 2,119,325 | Goodhart | May 31, 1938 |
| 2,143,900 | Rarey | Jan. 17, 1939 |
| 2,369,552 | Ferran | Feb. 16, 1945 |
| 2,510,244 | Moltrup | June 6, 1950 |
| 2,535,564 | Campbell | Dec. 26, 1950 |